Patented Jan. 10, 1939

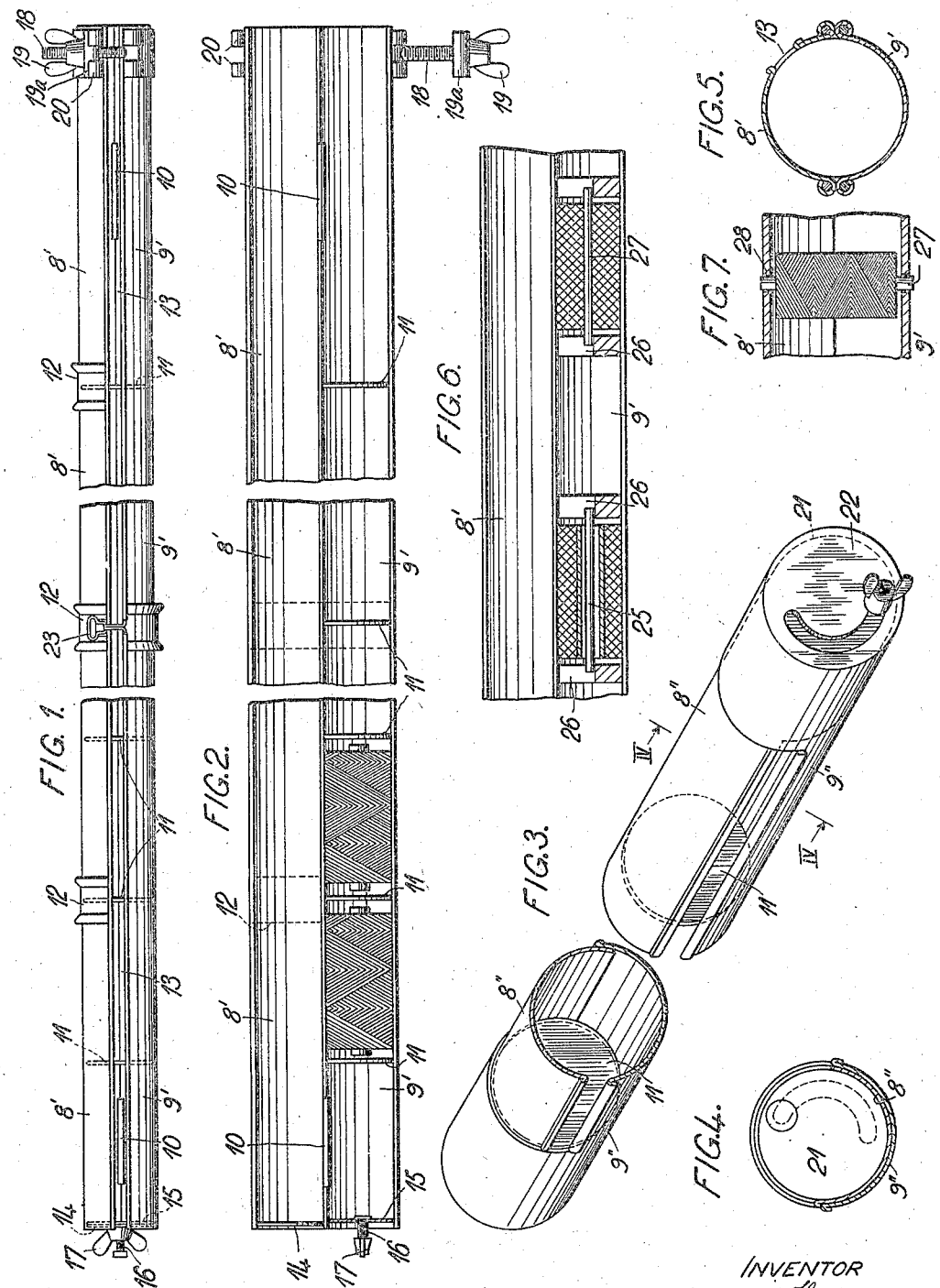

2,143,333

UNITED STATES PATENT OFFICE 2,143,333

MEANS FOR SPREADING COTTON OR THE LIKE

Roy Campbell Thomson, Chelsea, London, England

Application July 3, 1935, Serial No. 29,741
In Great Britain July 9, 1934

2 Claims. (Cl. 242—134)

This invention relates to apparatus for spreading simultaneously a plurality of lines of cotton, twine, fine wire or the like for example over sown or planted ground and over and around bushes and trees in order to provide a deterrent to birds, from a plurality of sources of supply.

An object of the invention is to provide a single holder adapted to be mounted on a pole for manipulation at a height and to support a plurality of sources of supply in such a manner that they are kept in position but can be independently exchanged. A preferred arrangement consists of a plurality of compartments each housing a supply in a compact fashion, this arrangement having the advantage that supplies with or without a central bore can be used. The compartments are conveniently formed between the halves of an elongated cylindrical container, suitable dividing means being provided between the compartments. The container is divided longitudinally to open it and the two halves may be hinged together or slidable concentrically with respect to one another. Other objects and features of the invention will appear from the following description, reference being had to the accompanying drawing in which Figure 1 is a front view of one embodiment of the invention, closed ready for use.

Figure 2 is a plan view of the device shown in Figure 1, open for insertion, removal or exchange of the supplies of cotton or the like.

Figure 3 is a view in perspective of part of an alternative to Figures 1 and 2, in the closed position and Figure 4 is a cross section on the line IV—IV of Figure 3 in the open position.

Figure 5 is a cross section of an alternative to Figure 1, and

Figures 6 and 7 show detail variations of Figure 2.

The device illustrated in Figures 1 and 2 comprises a pair of elongated substantially semi-cylindrical members 8', 9' hinged together along one edge 10. The member 9' is provided at suitable intervals with partitions 11, here shown as plain discs though any other suitable form of partition may be used. The members 8', 9' are conveniently of thin sheet metal and may be reinforced by channel section pieces 12 at intervals.

When the members 8', 9' are closed as in Figure 3 a series of separate compartments is formed for the reception of the supplies of cotton or the like, and in the form illustrated, the discs 11 and members 8', 9' made of such sizes that a slot 13 is left over the whole length of the device through which the cotton or the like can emerge. Instead the device may be arranged to close completely and slots may be provided in one of the members 8' and 9' as indicated at 13 in Figure 5 which is a detail cross section.

The device is conveniently held closed by a wire catch 23 at the centre and is also held closed at the ends. At the left hand end, the members 8', 9' have respective discs 14, 15 which overlap in the closed position. One disc carries a screw 16 and the other is slotted to clear the screw during opening and closing, a wing nut 17 on the screw clamping the parts together in the closed position. At the right hand end, I have shown a device similar to a hose clip, comprising a swivelling bolt 18 pivoted on one member and carrying a wing nut 19 and bar 19a engaging an abutment 20 on the other member.

The clip device 18, 19, 20 enables the device to be mounted on a pole to permit it to be manipulated at a height for example when swathing tall trees. A straight or angular clamping sleeve fitted with a clip at each end similar to 18, 19, 20 may be used to attach another pole end to end to the first and so on.

Instead of the parts 8', 9' being hinged together they may slide concentrically. This alternative is illustrated in Figure 3. Here the member 8" provided with the separating discs or the like 11 is of slightly smaller diameter than member 9", and both members have full cylindrical ends 21, 22 respectively, one inside the other. The parts 8" 9" may be assembled by leaving one end of member 9" open, sliding into it the member 8" and then attaching the end disc closure 22 of member 9" as by soldering. They can thus be turned relatively to one another from the closed position of Figure 3 to the open position of Figure 4 for access to the supplies. The slots for the emergence of the cotton or the like can be provided as described above and the parts clamped open or closed by any suitable means, for example by means of a screw and wingnut at one end.

It will be observed that the constructions shown in Figures 1 to 3 provide cylindrical compartments adapted to receive the usual cylindrical reels or cops of cotton or the like in coaxial relationship, the sizes of the compartments being made such that the reels or cops are free to revolve about their axes but not to turn and set themselves into unsuitable positions. It will further be observed that no spindles or pivots are necessary and therefore supplies without a central bore such as balls on cops or reels with a thin centre can be used, thus reducing the size of the supplies and container to a minimum for a given quantity of cotton or the like.

The invention is not limited to the construction above described. Thus the container can be of convenient section with a hinged, clamped, or sliding lid, and the partitions may sometimes be omitted. It is also possible, if desired, as shown in Figure 6 to provide spindles 25 one for each compartment with its ends fitting into slots or apertures 26 in the partitions. Or the reels might be made with pivots 27 fitting into such slots or apertures. Further as shown in Figure 7 it may be arranged so that the supplies are held not co-axially but with their axes say perpendicular to the length of the container, in which case such spindles 25 or pivots 27 could fit into slots or apertures 28 in the body and/or lid of the container rendering partition walls unnecessary.

What I claim is:—

1. Apparatus for spreading simultaneously a plurality of lines of cotton, twine, or fine wire, comprising an elongated cylindrical container slotted to permit the paying out of the lines, and partitions dividing the container into a plurality of compartments each adapted to house a supply in a compact fashion, said container being open at one end to form a socket to receive a pole.

2. Apparatus for spreading simultaneously a plurality of lines of cotton, twine, or fine wire, comprising a cylindrical container divided longitudinally substantially into halves, hinges connecting the halves of the container, partitions subdividing the container into a series of compartments one for each supply of cotton, said container being open at one end to admit a pole or the like, and a clamp at such open end for clamping it upon said pole.

ROY CAMPBELL THOMSON.